(12) United States Patent
Wilson

(10) Patent No.: US 6,821,076 B1
(45) Date of Patent: Nov. 23, 2004

(54) MATERIAL DISTRIBUTOR

(76) Inventor: Roger A. Wilson, 930-106th La. NW. #10, Coon Rapids, MN (US) 55433

( * ) Notice: Subject to any disclaimer, the term of this patent is extended or adjusted under 35 U.S.C. 154(b) by 32 days.

(21) Appl. No.: 09/991,352

(22) Filed: Nov. 20, 2001

(51) Int. Cl.[7] ............................................. A01C 15/18
(52) U.S. Cl. ..................................... 414/523; 239/679
(58) Field of Search ................................ 239/650, 662, 239/679; 414/141.1, 142.2, 142.5, 394, 680, 523, 521; 198/550.2, 550.12, 703

(56) References Cited

U.S. PATENT DOCUMENTS

| | | | | |
|---|---|---|---|---|
| 648,152 A | * | 4/1900 | Loessner | 239/671 |
| 1,299,948 A | * | 4/1919 | Isaman | 239/650 |
| 1,719,770 A | * | 7/1929 | Kenney | 239/650 |
| 1,729,369 A | * | 9/1929 | Tucker | 239/671 |
| 2,318,406 A | * | 5/1943 | MacDonald | 239/650 |
| 2,408,863 A | | 10/1946 | Lisota | 198/233 |
| 3,263,836 A | * | 8/1966 | Krucera | 414/519 |
| 3,602,404 A | * | 8/1971 | Frank | 222/252 |
| 3,908,837 A | * | 9/1975 | Strocker | 198/519 |
| 3,978,996 A | | 9/1976 | Oltrogge | 214/17 D |
| 4,020,574 A | | 5/1977 | Wagner | 37/126 AE |
| 4,277,220 A | | 7/1981 | Wiley | 414/539 |
| 4,440,537 A | * | 4/1984 | Blattermann et al. | 414/141.1 |
| 4,732,330 A | * | 3/1988 | Groeneveld et al. | 239/670 |
| 5,156,518 A | | 10/1992 | VanMatre | 414/527 |
| 5,180,112 A | | 1/1993 | Hoyle | 239/685 |
| 5,540,533 A | * | 7/1996 | Eskelinen | 414/313 |
| 5,564,878 A | * | 10/1996 | Kay | 414/141.1 |

* cited by examiner

*Primary Examiner*—Eileen D. Lillis
*Assistant Examiner*—Charles A. Fox
(74) *Attorney, Agent, or Firm*—Nikolai & Mersereau, P.A.

(57) ABSTRACT

A material distribution device having a hopper and a conveyor belt with paddles for removing material from the hopper. The conveyor is pivotally connected to the hopper to be lowered into the top of the material in the hopper and scrape the top layer of material from the load in the hopper off of the load and expel it from the hopper. When the hopper is on a trailer or other vehicle the rate of the conveyor belt can be controlled to distribute the material from the hopper at an even rate.

12 Claims, 4 Drawing Sheets

MATERIAL DISTRIBUTOR

BACKGROUND OF THE INVENTION

1. Field of the Invention

This invention relates to a material distributing device, which uses a conveyor to remove material from the top of a load of material in the hopper of a trailer.

2. Description of the Related Art

Hauling material in a hopper to an area and then spreading the material evenly while unloading the hopper is a problem for farmers, gardeners and others. Unloading the hopper can be accomplished by dropping the material out of the bottom of the hopper which tends to unload the hopper faster at the beginning of the unloading process than toward the end of the unloading process. Sometimes the load will not be removed from the aperture in the bottom of the hopper due to jams caused by clumps of material. Augers, conveyors or other unloading devices to aid in removing the material from the hopper and to measure the unloading evenly at the bottom of the load have a large power requirements to move the material under the weight of the load in the hopper.

Another method is to unload the hopper by expelling the material out of the back of the trailer such as by opening a tail gate and then forcing the material out of the back of the trailer by moving the material on a conveyor or by an elongated apron for forcing the material out of the back of a trailer or truck bed. The force required to move the entire load in this manner is excessive particularly with a full load in the bed of the truck or trailer. This forceful pushing of the material out of the back of a moving truck does not result in the even distribution of the material on the ground.

A dump truck is sometimes used to unload a truck bed but results in uneven spreading of the material.

SUMMARY OF THE INVENTION

A trailer having a conveyor belt with paddles thereon for removing material from the top of a load in a hopper only uses the force necessary to move the top layer of the material and unloads the material at an even pace without interference from the rest of the load.

A conveyor belt with the paddles for removing the material can be powered from the drive wheels of the trailer such that the unloading rate is directly related to the speed of the trailer for an even distribution of the material.

The conveyor belt can dig deeper into the trailer as the trailer is unloaded by pivoting on one axis. If the trailer has a shape to accommodate the pivoting conveyor the entire contents of the trailer can be removed at an even rate with a low power requirement.

OBJECTS OF THE INVENTION

It is an object of the invention to spread material from a hopper at an even rate as the hopper is moved over a given area for depositing the material.

It is an object of the invention to require a minimum of power for removing the material from the hopper and spreading the material evenly.

It is an object of the invention to remove all of the material from the hopper.

Other objects, advantages and novel features of the present invention will become apparent from the following detailed description of the invention when considered in conjunction with the accompanying drawing.

DESCRIPTION OF THE PREFERRED EMBODIMENTS

Figure 1:
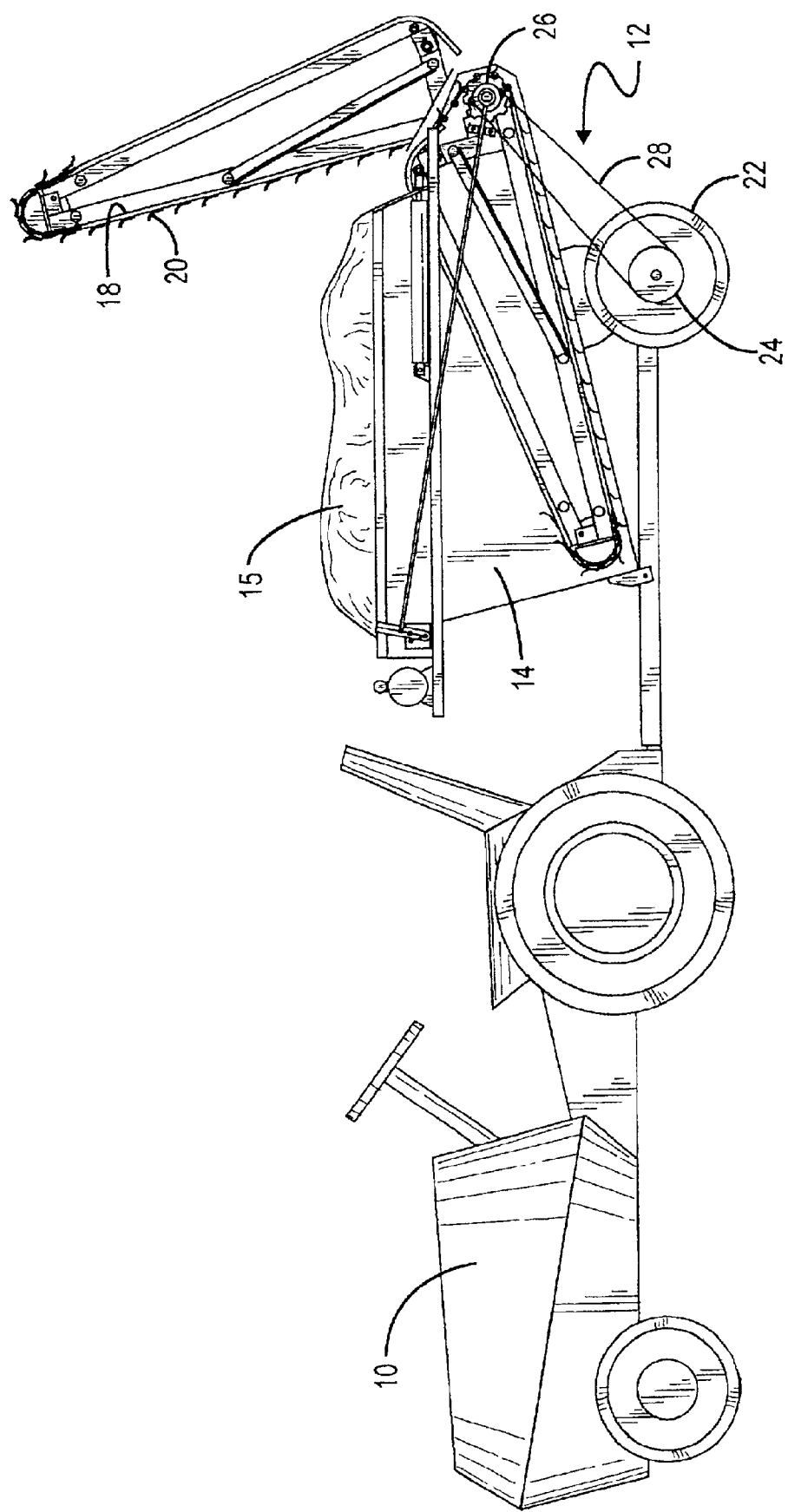
FIG. 1 is a side view of the trailer being pulled by a tractor.

FIG. 1 shows a tractor 10 pulling the material distribution trailer 12 behind it. The material distribution trailer 12 has a hopper 14 for carrying material 15 to be distributed. The trailer 12 in the embodiment shown has a drive wheel 22 with a sprocket 24 attached to it. As the drive wheel 22 turns the sprocket 24 turns at the same rate. The sprocket 24 is connected to a sprocket 26, which drives a conveyor belt 18, by chain 28. The conveyor belt 18 unloads the material 15 from the hopper 14 at a rate directly related to the speed of the drive wheel 22.

Figure 2:
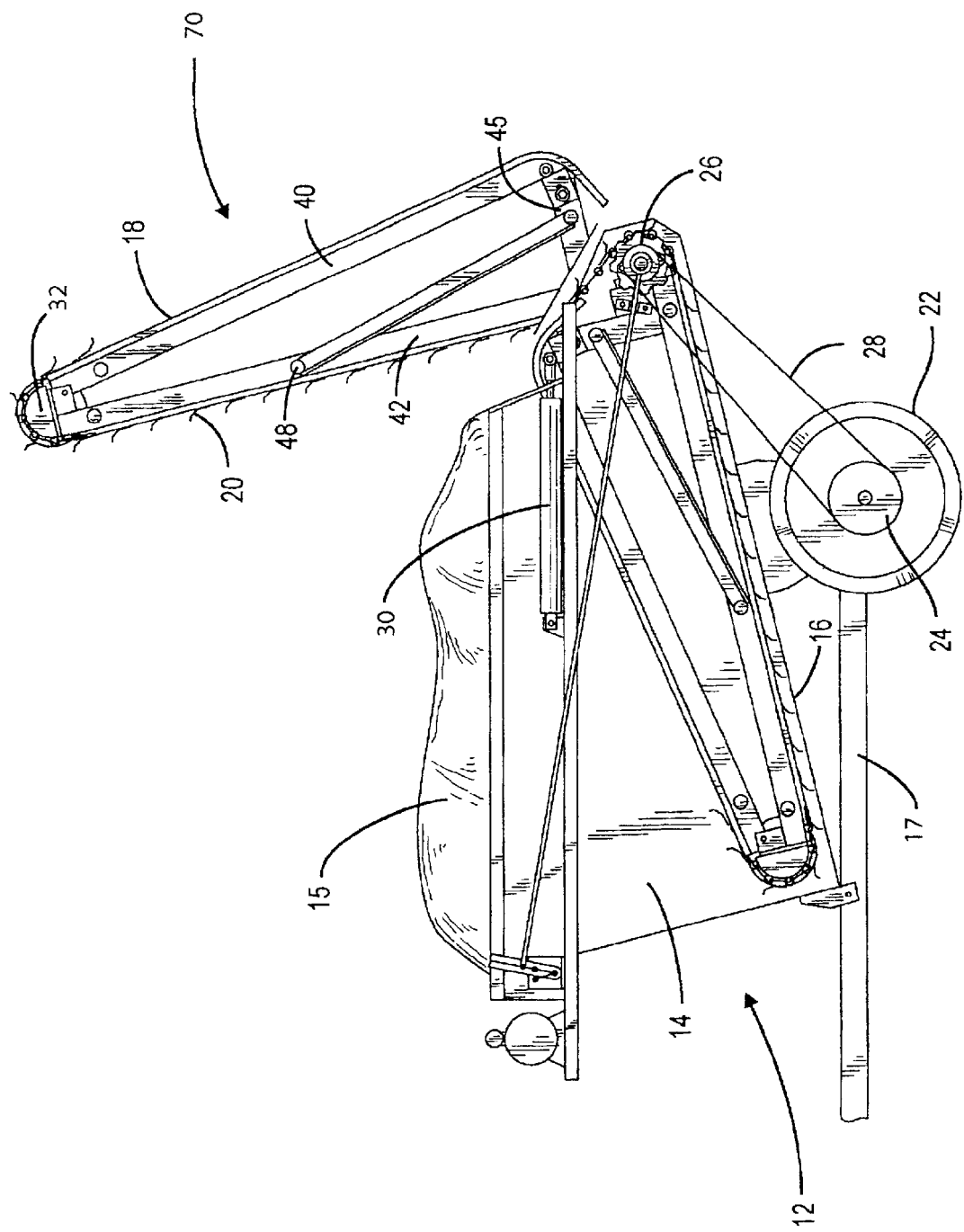
FIG. 2 is a side view of the trailer.

As shown in greater detail in FIG. 2, as the trailer 12 is pulled by the tractor 10 the conveyor 18 starts unloading the material 15 from the hopper 14 while the conveyor assembly 70 is in the raised position. As the material 14 is removed from the top of the load in the hopper 14 the conveyor assembly is lowered into the load of material 15 until it reaches a position the bottom of the hopper 14. As shown the hopper 14 has an angled bottom 16, such that the pivoting of the conveyor assembly 70 will move in an arch empting all the material from the hopper.

Figure 3:
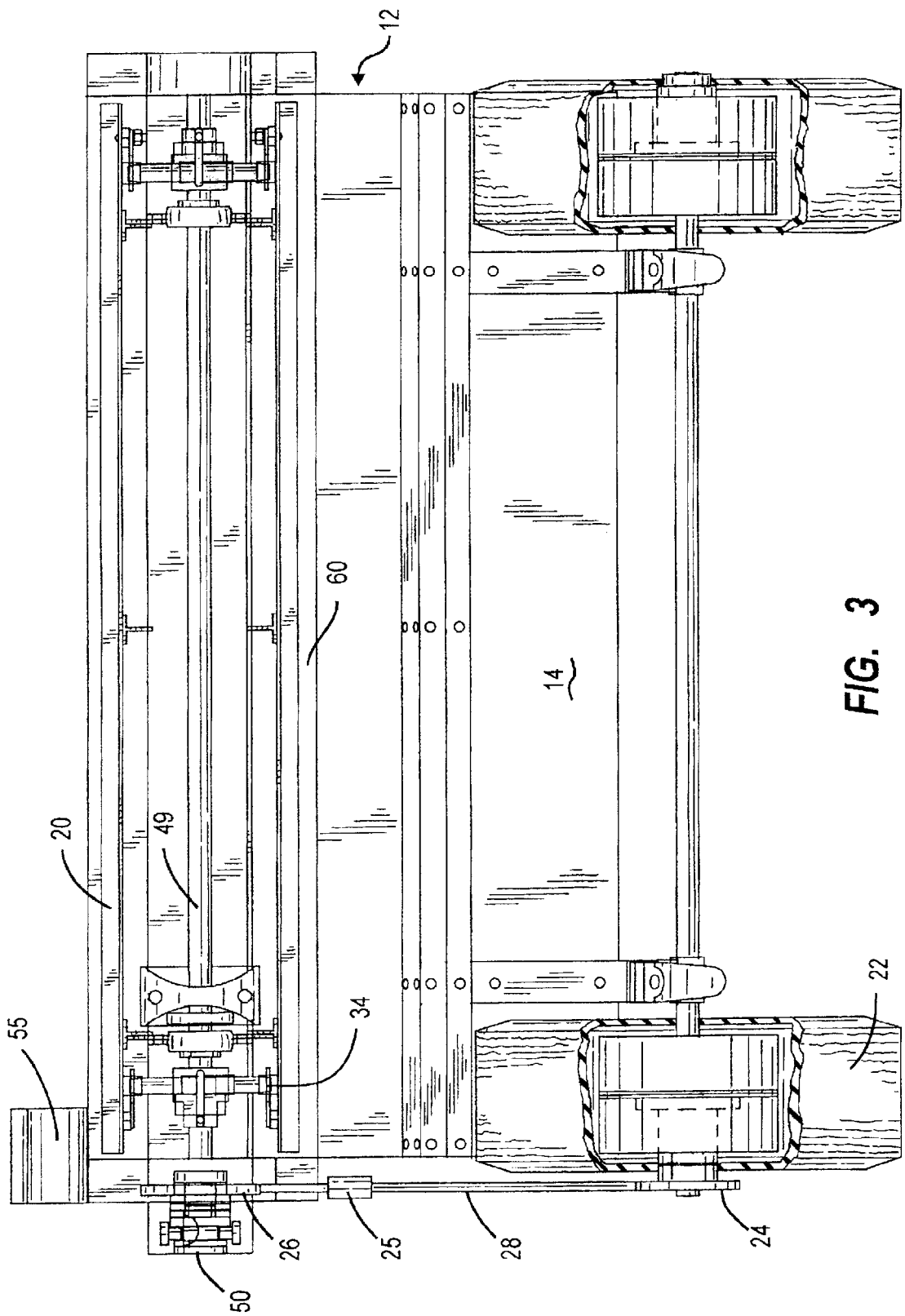
FIG. 3 is a rear view of the trailer.

As shown in FIG. 3 the sprocket 24 on the drive wheel 22 is connected to chain 28 which drives sprocket 26 on conveyor axel 49 for moving conveyor 18. The sprocket sizes for sprockets 24 and 26 may be changed to change the ratio of the speed of the drive wheel 22 to the speed of the conveyor axel 49 to spread the material 15 at different rates. The sprocket sizes may physically be changed, or a series of gears may be used with a gear shifting device 25, to change the ratio of the speeds of the drive wheel and the conveyor axel. In addition to the ability to change the ratios of the drive wheel 22 to the conveyor axel 49 a clutch 50 may be used to engage or disengage the drive wheel 22 from the conveyor axel 49. The conveyor 18 may thus be engaged when the material 14 is to be unloaded and not engaged at other times.

The conveyor assembly 70 may be lowered into the load by its own weight. Further the torque on the conveyor assembly 70 from engaging the material 15 may help force the conveyor assembly 70 into the material 15. The conveyor assembly 70 may alternatively be raised and lowered into the material 15 by a hydraulic cylinder 30 or equivalent device as best seen in FIG. 2.

As best seen in FIG. 3 the material 15 is expelled through slot 60 in the rear of hopper 14 by the paddles 20 attached to conveyor belt 18.

Figure 4:
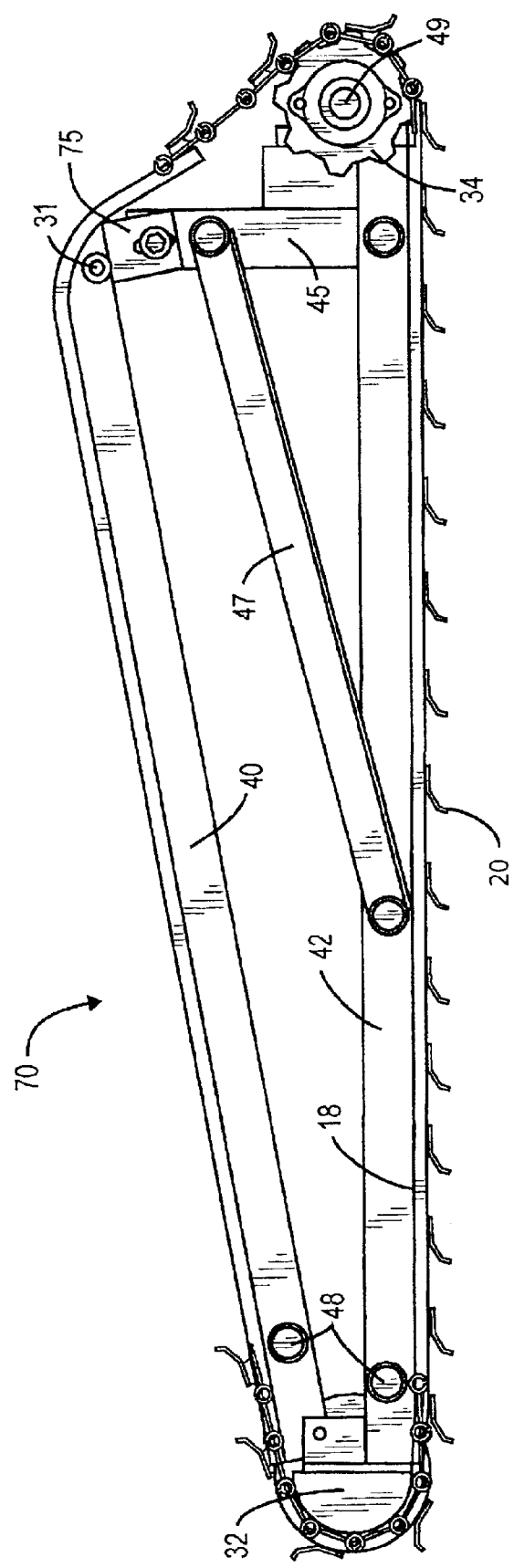
FIG. 4 is a side view of the conveyor assembly.

The conveyor assembly 70 may be of any construction such that the conveyor belt 18 is supported to rotate and to remove material 15 from hopper 14. As shown in FIG. 4 the conveyor assembly 70 has a front pulley or sprocket 32 on each side of the conveyor belt 18 for engaging the conveyor belt 18, a rear pulley or sprocket 34 on each side of the conveyor belt 18 for engaging the conveyor belt and for being attached to and driven by the conveyor axel 49. In the embodiment shown the conveyor assembly comprises a top frame member 40, a bottom frame member 42, a rear support member 45 and a support brace 47. The conveyor belt 18 has paddles 20 attached for engaging and moving material 15. The conveyor belt 18 may be supported on guide rollers 48 or by other means known to those skilled in the conveyor belt industry. The conveyor belt 18 may be a chain having paddles 20 connected thereto and be driven by sprockets 34 on conveyor axel 49. Sprockets 32 and in the front of the conveyor assembly 70 and roller 31 at the top of the conveyor assembly 70 keep the conveyor belt 18 in place on the conveyor assembly 70. A conveyor belt tightening adjustment mechanism 75 is used when adding or change conveyor belts or to adjust the tension on the conveyor belts 18.

In an alternative embodiment the conveyor 18 can be driven by a motor 55, such as an electric or hydraulic motor, or some other power source independent of the drive wheel 22. The power source may be used in conjunction with the clutch 50 or without the clutch 50 to drive the conveyor 18 at the desired rate for distribution of the material 15 out of hopper 14.

Although the material distributor is shown empting the contents of a hopper 14 on a trailer 12 the hopper 14 can be on a truck bed or on any means of conveyance including ships, barges, aircraft, or land vehicles.

Obviously, many modifications and variations of the present invention are possible in light of the above teachings. It is therefore to be understood that, within the scope of the appended claims, the invention may be practiced otherwise than as specifically described.

What is claimed is:

1. A material distributing device comprising, a hopper for carrying a load of material to be distributed, the hopper having a front end and a rear end and a bottom sloped upward from the front end to the rear end, a conveyor belt having paddles thereon for engaging and moving the material to be distributed, the conveyor belt supported by a ridged unjointed framework which is pivotally connected to the hopper at the rear end near the bottom and engages the material in the hopper from the top of the material, such that as the conveyor belt pivots downward it becomes parallel to the bottom of the hopper, the conveyor belt framework being triangular with a first apex of the triangle at the rear end near the bottom of the hopper, a second apex of the triangle being at the front end of the hopper, and a third apex being above and generally forward of the first apex, such that material is moved by the conveyor belt forward on the underside of the conveyor belt from the second apex to the first apex, and then discharged at the rear end of the hopper by flowing out a slot at the rear end of the hopper, a drive mechanism attached to the conveyor belt for powering the conveyor belt and removing the material from the hopper.

2. A material distributing device as in claim 1 wherein, the hopper is supported on a trailer, and the drive mechanism includes a trailer wheel having a sprocket, the sprocket having a chain for transmitting power to a sprocket on a drive axel for turning the conveyor belt such that as the drive wheel of the trailer turns when the trailer is moving the conveyor belt moves at a rate proportional to the trailers speed to unload the material in the hopper to distribute the load at a known rate.

3. A material distributing device as in claim 2 wherein, a clutch attached to the sprocket on a drive axel for turning the conveyor belt alternately engages the drive axel to distribute the material in the hopper at desired times.

4. A material distributing device as in claim 2 wherein, a gear shifting mechanism in conjunction with the sprocket on the drive wheel and the sprocket on the drive axel for turning the conveyor belt changes the ratio of the drive wheel speed to the conveyor belt speed for varying the rate of material distribution from the hopper.

5. A material distributing device as in claim 3 wherein, a gear shifting mechanism in conjunction with the sprocket on the drive wheel and the sprocket on the drive axel for turning the conveyor belt changes the ratio of the drive wheel speed to the conveyor belt speed for varying the rate of material distribution from the hopper.

6. A material distributing device as in claim 3 wherein, a drive motor drives the drive axel for turning the conveyor belt such that the material can be unloaded from the hopper when the motor is on and unloads the hopper at a rate directly proportional to the motor speed.

7. A material distributing device as in claim 1 wherein, a drive mechanism raises and lowers the conveyor belt support framework to engage or disengage the conveyor belt from the material to be distributed and to aid in loading the hopper with the conveyor out of the way.

8. A material distributing device as in claim 2 wherein, a drive mechanism raises and lowers the conveyor belt support framework to engage or disengage the conveyor belt from the material to be distributed and to aid in loading the hopper with the conveyor out of the way.

9. A material distributing device as in claim 3 wherein, a drive mechanism raises and lowers the conveyor belt support framework to engage or disengage the conveyor belt from the material to be distributed and to aid in loading the hopper with the conveyor out of the way.

10. A material distributing device as in claim 4 wherein, a drive mechanism raises and lowers the conveyor belt support framework to engage or disengage the conveyor belt from the material to be distributed and to aid in loading the hopper with the conveyor out of the way.

11. A material distributing device as in claim 5 wherein, a drive mechanism raises and lowers the conveyor belt support framework to engage or disengage the conveyor belt from the material to be distributed and to aid in loading the hopper with the conveyor out of the way.

12. A material distributing device as in claim 6 wherein, a drive mechanism raises and lowers the conveyor belt support framework to engage or disengage the conveyor belt from the material to be distributed and to aid in loading the hopper with the conveyor out of the way.

* * * * *